(12) United States Patent
Namekata

(10) Patent No.: US 10,996,497 B2
(45) Date of Patent: May 4, 2021

(54) DISPLAY DEVICE AND METHOD FOR PRODUCING DISPLAY DEVICE

(71) Applicant: Panasonic Intellectual Property Management Co., Ltd., Osaka (JP)

(72) Inventor: Yuuki Namekata, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/592,911

(22) Filed: Oct. 4, 2019

(65) Prior Publication Data

US 2020/0033649 A1     Jan. 30, 2020

Related U.S. Application Data

(63) Continuation of application No. PCT/JP2018/022304, filed on Jun. 12, 2018.

(30) Foreign Application Priority Data

Jun. 14, 2017   (JP) ................................. 2017-116644

(51) Int. Cl.
    *G02F 1/1333*      (2006.01)
    *G02B 5/30*      (2006.01)
    *G02F 1/1362*      (2006.01)

(52) U.S. Cl.
    CPC ............ *G02F 1/1333* (2013.01); *G02B 5/30* (2013.01); *G02F 1/136286* (2013.01); *G02F 2202/28* (2013.01)

(58) Field of Classification Search
    CPC ............... G02F 1/1333; G02F 2202/28; G02F 1/136286; G02B 5/30

USPC .......................................................... 349/56
See application file for complete search history.

(56) References Cited

U.S. PATENT DOCUMENTS

| | | | |
|---|---|---|---|
| 2011/0037932 A1* | 2/2011 | Takahashi | ......... G02F 1/133707 349/129 |
| 2015/0253604 A1* | 9/2015 | He | ....................... G02F 1/13394 349/42 |
| 2017/0010399 A1* | 1/2017 | Yasui | ......................... B32B 7/12 |
| 2020/0058876 A1* | 2/2020 | Son | ........................... C09J 11/04 |

FOREIGN PATENT DOCUMENTS

| | | |
|---|---|---|
| JP | 7-092321 | 4/1995 |
| JP | 2002-243940 | 8/2002 |
| JP | 2002243940 A * | 8/2002 |

OTHER PUBLICATIONS

International Search Report of PCT application No. PCT/JP2018/022304 dated Sep. 4, 2018.

\* cited by examiner

*Primary Examiner* — Nathanael R Briggs
*Assistant Examiner* — William D Peterson
(74) *Attorney, Agent, or Firm* — Greenblum & Bernstein, P.L.C.

(57) ABSTRACT

A display device includes a display, a protective layer, and a bonding layer. The display has a polarizing plate configuring an image display plane of a display. The protective layer faces the polarizing plate. The bonding layer is disposed between the polarizing plate and the protective layer and is directly bonded to the polarizing plate and the protective layer. The bonding layer contains a hygroscopic agent.

7 Claims, 10 Drawing Sheets

DISPLAY DEVICE AND METHOD FOR PRODUCING DISPLAY DEVICE

CROSS-REFERENCE TO RELATED APPLICATIONS

This application is a continuation of the PCT International Application No. PCT/JP2018/022304 filed on Jun. 12, 2018, which claims the benefit of foreign priority of Japanese patent application No. 2017-116644 filed on Jun. 14, 2017, the contents all of which are incorporated herein by reference.

BACKGROUND

1. Technical Field

The present disclosure relates to a display device having a structure in which a protective layer and a polarizing plate are bonded with a bonding layer. The present disclosure also relates to a method of producing the display device.

2. Description of the Related Art

Polarizing plates used in liquid crystal display devices or the like are less durable in hot and humid environments. Considering this point, a technology to improve durability of the polarizing plates by using proper materials for the polarizing plates is known (e.g., refer to Japanese Unexamined Patent Publication No. H07-92321).

SUMMARY

The present disclosure provides a display device that can improve reliability at a high temperature and a method of producing the display device.

A display device in an aspect of the present disclosure includes a display, a protective layer, and a bonding layer. The display has a polarizing plate configuring an image display plane of the display. The protective layer faces the polarizing plate. The bonding layer is disposed between the polarizing plate and the protective layer and is directly bonded to the polarizing plate and the protective layer. The bonding layer contains a hygroscopic agent.

Another aspect of the present disclosure is a method for producing a display device. This method includes a step of applying a translucent adhesive containing a hygroscopic agent to a surface of a polarizing plate configuring an image display plane of a display. The method further includes a step of sandwiching the applied translucent adhesive between the polarizing plate and a protective layer so as to bond the protective layer to the polarizing plate. The method further includes a step of hardening the translucent adhesive sandwiched between the polarizing plate and the protective layer.

Still another aspect of the present disclosure is a method for producing a display device. This method includes a step of disposing a mask on a surface of a polarizing plate configuring an image display plane of a display. The mask has a plurality of openings. The method further includes a step of filling the plurality of openings of the mask on the polarizing plate with a hygroscopic agent. The method further includes a step of removing the mask from the surface of the polarizing plate. The method further includes a step of applying a translucent adhesive to the surface of the polarizing plate from which the mask has been removed and the hygroscopic agent left on the surface of the polarizing plate. The method further includes a step of sandwiching the applied translucent adhesive between the polarizing plate and a protective layer so as to bond the protective layer to the polarizing plate. The method further includes a step of hardening the translucent adhesive sandwiched between the polarizing plate and the protective layer.

According to the present disclosure, it is possible to improve the reliability of the display device at a high temperature.

DETAILED DESCRIPTION OF PREFERRED EMBODIMENTS

Prior to describing exemplary embodiments of the present disclosure, problems of the conventional technology will be briefly described. Such display devices have recently been adopted that have a structure called "direct bonding" or "optical bonding", in which a protective layer and a polarizing plate are bonded with a translucent adhesive. In this technology, since an air layer between the protective layer and the polarizing plate can be eliminated, reflection of external light is reduced at the interface between the polarizing plate and the air layer and at the interface between the protective layer and the air layer, so that the image quality of the display device is improved. In these display devices each having the direct bonding structure, however, the characteristics of the polarizing plate are more easily deteriorated in high temperature conditions compared to the display devices each having the air layer between the protective layer and the polarizing plate. Also, it might not be enough, as a measure to cope with this problem, to merely improve durability of the polarizing plate itself like the manner of the above-described conventional technology.

First Exemplary Embodiment

Prior to specifically describing a first exemplary embodiment, overview of the first exemplary embodiment will be described. The first exemplary embodiment relates to a display device having a structure in which a protective layer and a polarizing plate are bonded with a bonding layer. The protective layer contains a glass, a plastic, or the like, and thus exhibits almost no moisture permeability. The bonding layer is more moisture permeable than the protective layer. Due to this property of the protective layer, moisture contained in the polarizing plate cannot evaporate in high temperature conditions and stays in the polarizing plate. As a result, a chemical change caused by the moisture and temperature conditions occurs in the polarizing plate to cause a color change at the center of the polarizing plate. In other words, as described before, the characteristics of the polarizing plate will be degraded in high temperature conditions. The color change of the polarizing plate causes a color change in the displayed image. Considering this problem, in the display device according to the first exemplary embodiment, the bonding layer contains a hygroscopic agent.

Figure 1:
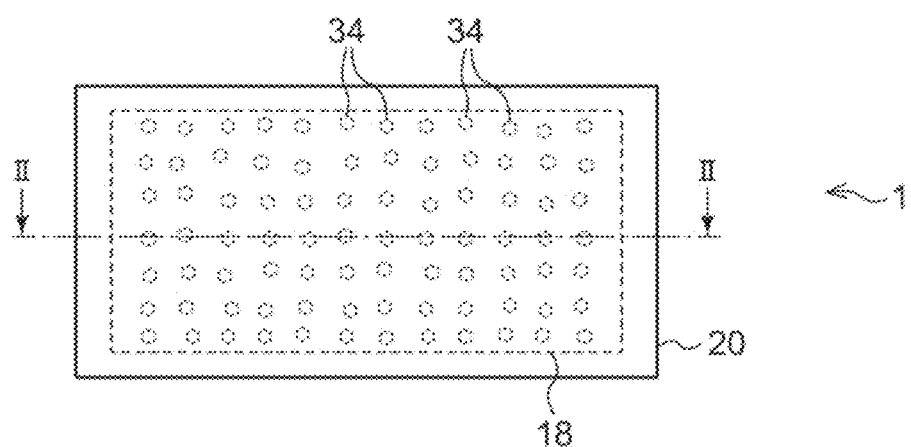
FIG. 1 is a top view schematically illustrating a display device according to a first exemplary embodiment.
Figure 2:
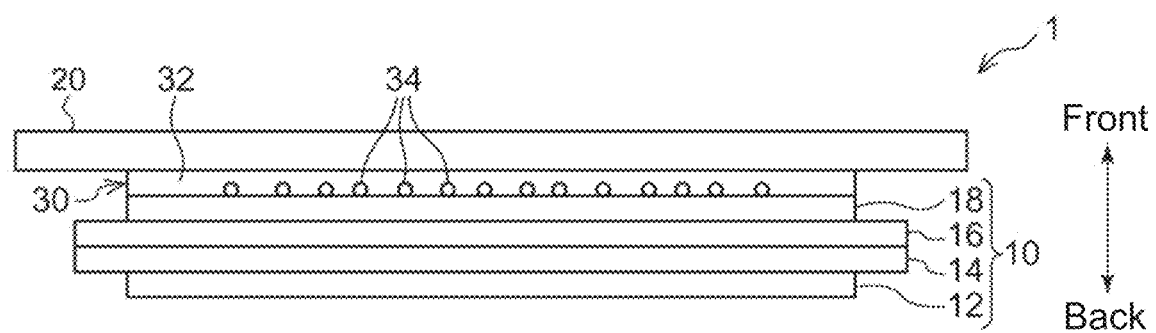
FIG. 2 is a schematic diagram illustrating a cross-section along a line II-II of the display device shown in FIG. 1.

FIG. 1 is a top view schematically illustrating display device 1 according to the first exemplary embodiment. FIG. 2 is a schematic diagram illustrating a cross-section along a line II-II of display device 1 shown in FIG. 1. Although the use of display device 1 may not particularly be limited, display device 1 may be used as a vehicle-onboard display. Display device 1, which may be configured as a liquid crystal display device, has display 10, protective layer 20, and bonding layer 30.

Display 10 uses light radiated from an unillustrated backlight disposed at the back side to output image light from the front end, or the users side. Display 10 has a well-known structure as, for example, described below.

Display 10 has polarizing plate 12, thin-film transistor substrate 14, color filter substrate 16, and polarizing plate 18. Polarizing plate 12, which is also called a lower polarizing plate, is disposed to face the backlight and is positioned at the back end of display 10. Thin-film transistor substrate 14, which is also called a thin-film transistor (TFT) substrate, is disposed at the front side of polarizing plate 12. Color filter (CF) substrate 16 is disposed at the front side of thin-film transistor substrate 14 so that an unillustrated liquid crystal layer is sandwiched between color filter substrate 16 and thin-film transistor substrate 14. Color filter substrate 16 has a plurality of unillustrated colored layers.

Polarizing plate 18, which is also called an upper polarizing plate, is disposed at the front side of color filter substrate 16 and is positioned at the front end of display 10. A front surface of polarizing plate 18 constitutes an image display plane of display 10.

Protective layer 20 has a translucency, is disposed at the front side of display 10, and faces polarizing plate 18. Protective layer 20 is a layer to protect display 10 or the like and is configured by a glass substrate or a plastic substrate. Protective layer 20 is also called a front panel. Protective layer 20 may have a function of a touch panel sensor. In such a case, protective layer 20 may be formed by the One Glass Solution (OGS), in which sensor electrodes are directly formed on a glass substrate.

Bonding layer 30 has a translucency and bonds polarizing plate 18 and protective layer 20 together. In other words, display device 1 has the direct bonding structure. Bonding layer 30 includes main component 32, and a plurality of particles of hygroscopic agent 34 dispersed in main component 32. Main component 32 is a hardened translucent adhesive. Materials that can be used as the translucent adhesive may, for example, be a transparent adhesive sheet such as an Optically Clear Adhesive (OCA) or the like or a liquid transparent resin such as an Optically Clear Resin (OCR) or the like.

As shown in FIG. 1, particles of hygroscopic agent 34 are dispersed irregularly over almost an entire region of polarizing plate 18. To clarify the explanation, the particle size of hygroscopic agent 34 is exaggerated in FIG. 1 and other figures. Hygroscopic agent 34 has translucency and absorbency. To reduce influence of hygroscopic agent 34 on the image light transmitting through hygroscopic agent 34, it is preferable that the translucency of hygroscopic agent 34 is high and the refractive index of hygroscopic agent 34 is close to the refractive index of main component 32. The material of hygroscopic agent 34 may not particularly be limited, and may, for example, be silica.

It is preferable that the volume of hygroscopic agent 34 contained in a unit volume of bonding layer 30 is larger in a region closer to polarizing plate 18 in bonding layer 30 than in a region closer to protective layer 20 in bonding layer 30. In the example shown in FIG. 2, hygroscopic agent 34 is disposed at a location that is substantially in contact with polarizing plate 18 in bonding layer 30.

Figure 3:
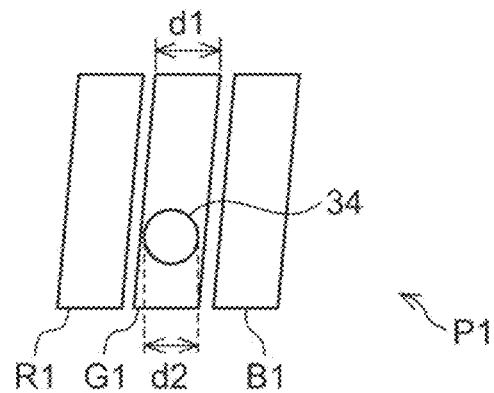
FIG. 3 is a top view illustrating an arrangement of a pixel of a display and a particle of a hygroscopic agent shown in FIG. 2.

FIG. 3 is a top view illustrating an arrangement of pixel P1 of display 10 and a particle of hygroscopic agent 34 shown in FIG. 2. Although not shown in the figure, display 10 includes a plurality of pixels P1 arranged in a matrix state. Each pixel P1 contains, for example, three color subpixels R1, G1 and B1. Subpixels R1, G1 and B1 correspond to three colored layers of color filter substrate 16. It is preferable that maximum particle diameter d2 of hygroscopic agent 34 is smaller than width d1 of each of subpixels R1, G1 and B1. The maximum particle diameter of hygroscopic agent 34 can be measured using a commercially available laser diffraction/scattering particle size distribution measuring device.

Figure 4A:
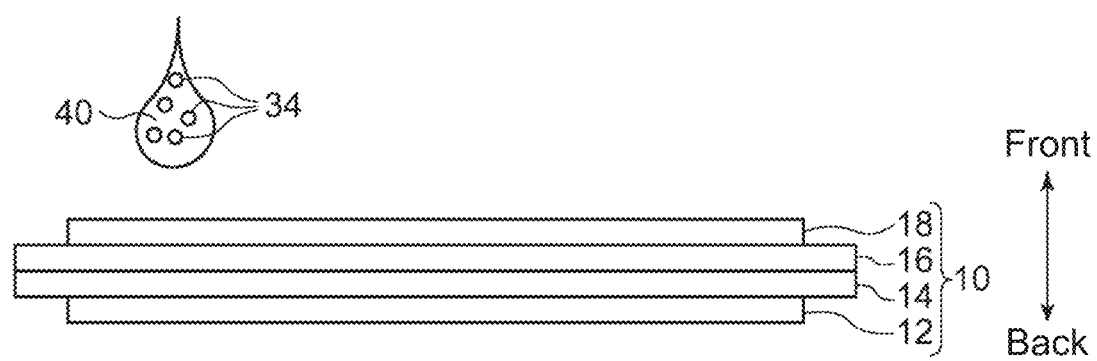
FIG. 4A is a diagram for explaining a method for producing the display device shown in FIG. 1.
Figure 4B:
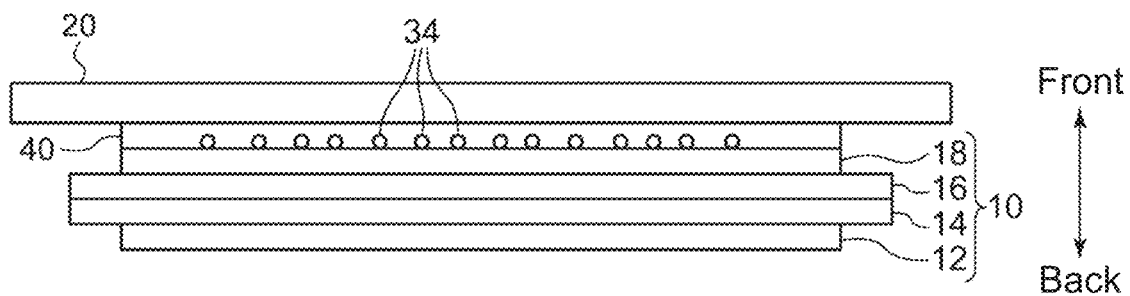
FIG. 4B is a diagram for explaining the method for producing the display device shown in FIG. 1.

Next, a method for producing display device 1 will be described. FIGS. 4A and 4B are diagrams for explaining a method for producing display device 1 shown in FIG. 1. First, as shown in FIG. 4A, display 10 is prepared, and translucent adhesive 40 containing hygroscopic agent 34 is applied to a front surface of polarizing plate 18 of display 10. Translucent adhesive 40 may be an OCR.

Next, as shown in FIG. 4B, the applied translucent adhesive 40 is sandwiched between protective layer 20 and polarizing plate 18 so as to bond protective layer 20 to polarizing plate 18. To allow hygroscopic agent 34 to be disposed in a region closer to polarizing plate 18 in bonding layer 30, it is preferable to hold it until hygroscopic agent 34 has sunk to a portion closer to polarizing plate 18 in bonding layer 30. In this case, it is preferable that the viscosity of translucent adhesive 40 is so low as to allow hygroscopic agent 34 to sink by gravity.

Next, translucent adhesive 40 is hardened by light or heat to form bonding layer 30 to complete display device 1 shown in FIG. 1.

Meanwhile, translucent adhesive 40 containing hygroscopic agent 34 may be applied to the front surface of polarizing plate 18 so that the coating layer of translucent adhesive 40 is thinner than that in the above-described producing method, and then, translucent adhesive 40 which does not contain hygroscopic agent 34 may be additionally applied to the previously-formed coating layer of translucent adhesive 40. This producing method also allows hygroscopic agent 34 to be disposed in a region closer to polarizing plate 18 in bonding layer 30. In this case, the viscosity of translucent adhesive 40 may be higher than that of the above-described producing method, but the viscosity may not particularly be limited. Accordingly, the freedom degree of selecting translucent adhesive 40 becomes higher.

Also, in a case where an OCA is used as translucent adhesive 40, particles of hygroscopic agent 34 may be disposed irregularly on the front surface of polarizing plate 18, and then the OCA may be bonded to the front surface of polarizing plate 18 from upside above hygroscopic agent 34.

Next, operations and advantageous effects of display device 1 will be described. Light radiated from the unillustrated backlight enters polarizing plate 12 from a back surface thereof and is optically modulated by the liquid crystal layer. The optically modulated light passes through polarizing plate 18, bonding layer 30 and protective layer 20 and is outputted as image light from the front surface of display device 1.

Since particles of hygroscopic agent particles 34 are disposed irregularly, some particles of hygroscopic agent 34 overlap with subpixels R1, G1 and B1. This may cause the image light that has passed through hygroscopic agent 34 to be relatively weakened compared to the image light that has not passed through hygroscopic agent 34 when the translucency of hygroscopic agent 34 is not adequately high. However, since maximum particle diameter d2 of hygroscopic agent 34 is smaller than width d1 of each of subpixels R1, G1 and B1, glare of the displayed image can be suppressed even when the translucency of hygroscopic agent 34 is not adequately high, so that reduction of image quality can be suppressed. If some particles of hygroscopic agent 34 have particle sizes which are equal to or larger than width d1 and the translucency of hygroscopic agent 34 is not adequately high, glare of the displayed image may become larger than the present exemplary embodiment. In a case where the translucency of hygroscopic agent 34 is adequately high, glare of the displayed image can be suppressed regardless of maximum particle diameter d2 of hygroscopic agent 34.

According to the present exemplary embodiment, since bonding layer 30 bonds polarizing plate 18 and protective layer 20 and contains hygroscopic agent 34, moisture contained in polarizing plate 18 evaporates and is absorbed by hygroscopic agent 34 in high temperature conditions. As a result, chemical reactions caused by the moisture and temperature in polarizing plate 18 in high temperature conditions can be suppressed, so that color change of polarizing plate 18 can be suppressed. In other words, deterioration in the characteristics of polarizing plate 18 can be suppressed. Accordingly, reliability of display device 1 at a high temperature can be improved.

The volume of hygroscopic agent 34 contained in a unit volume of bonding layer 30 is larger in a region closer to polarizing plate 18 in bonding layer 30 than in a region closer to protective layer 20 in bonding layer 30. In other words, hygroscopic agent 34 is disposed intensively in the region where moisture evaporated from polarizing plate 18 can easily be absorbed. Accordingly, color change of polarizing plate 18 can be effectively suppressed, while reducing the amount of hygroscopic agent 34.

Second Exemplary Embodiment

A second exemplary embodiment differs from the first exemplary embodiment in that the disposed position of hygroscopic agent 34 is controlled. The description hereinafter will be focused on differences from the first exemplary embodiment.

Figure 5:
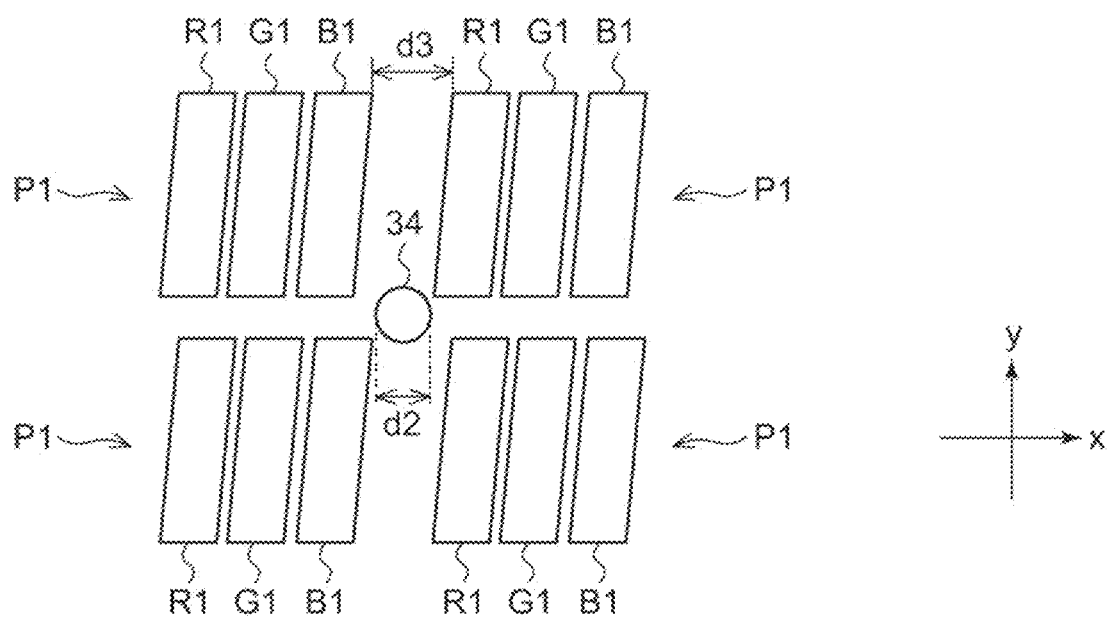
FIG. 5 is a top view illustrating an arrangement of pixels of a display and a particle of a hygroscopic agent according to a second exemplary embodiment.

FIG. 5 is a top view illustrating an arrangement of pixels P1 of display 10 and a particle of hygroscopic agent 34 according to the second exemplary embodiment. Four pixels P1 are shown in FIG. 5. Although not shown in the figure, thin-film transistor substrate 14 is provided with a wiring extending in the x direction between adjacent pixels P1 and a wiring extending in the y direction between adjacent pixels P1. Each region between adjacent pixels P1 is configured so as not to transmit light from the back side to the front side. Each particle of hygroscopic agent 34 is disposed at a position overlapping the wiring extending in the y direction between pixels P1 of display 10 in planar view. It is preferable that maximum particle diameter d2 of hygroscopic agent 34 is smaller than width d3 of the wiring extending in the y direction between pixels P1. The position of each particle of hygroscopic agent 34 may be a position overlapping a wiring extending in the y direction, without being limited to the position shown in the figure. Also, each particle of hygroscopic agent 34 may not be disposed in the position overlapping the wiring extending in the y direction, and instead may be disposed at a position overlapping the wiring extending in the x direction. In this case, it is preferable that maximum particle diameter d2 of hygroscopic agent 34 is smaller than the width of the wiring extending in the x direction between pixels P1.

Figure 6A:
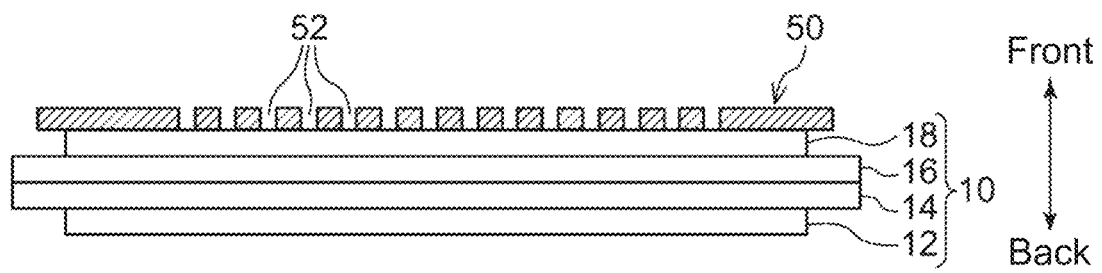
FIG. 6A is a diagram for explaining a method for producing the display device according to the second exemplary embodiment.

FIGS. 6A to 6D are diagrams for explaining a method for producing display device 1 according to the second exemplary embodiment. First, as shown in FIG. 6A, display 10 is prepared, and mask 50 is disposed on a front surface of polarizing plate 18 of display 10. Mask 50 has a plurality of openings 52. The plurality of openings 52 are disposed at positions where particles of hygroscopic agent 34 are to be disposed, or the positions above the wirings between pixels P1.

Figure 6B:
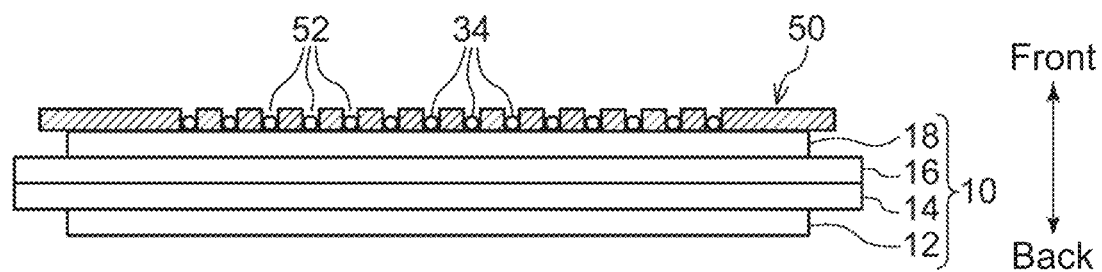
FIG. 6B is a diagram for explaining the method for producing the display device according to the second exemplary embodiment.

Next, as shown in FIG. 6B, the plurality of openings 52 of mask 50 on polarizing plate 18 are filled with hygroscopic agent 34.

Figure 6C:
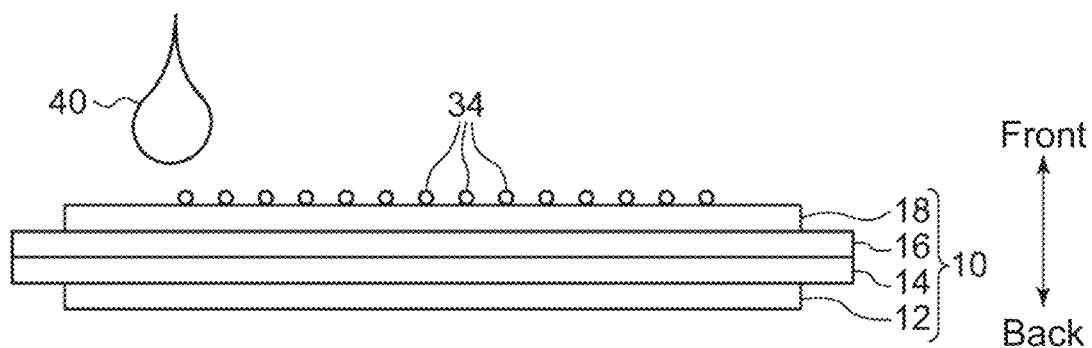
FIG. 6C is a diagram for explaining the method for producing the display device according to the second exemplary embodiment.

Next, as shown in FIG. 6C, mask 50 is removed, and translucent adhesive 40 is applied to the front surface of polarizing plate 18 from upside above hygroscopic agent 34. In a case where an OCR is used as translucent adhesive 40, as shown in FIG. 6C, the OCR may be applied to the front surface of polarizing plate 18 from upside above hygroscopic agent 34. Although not shown in the figure, in a case where an OCA is used as translucent adhesive 40, the OCA may be bonded to the front surface of polarizing plate 18 from upside above hygroscopic agent 34.

Figure 6D:
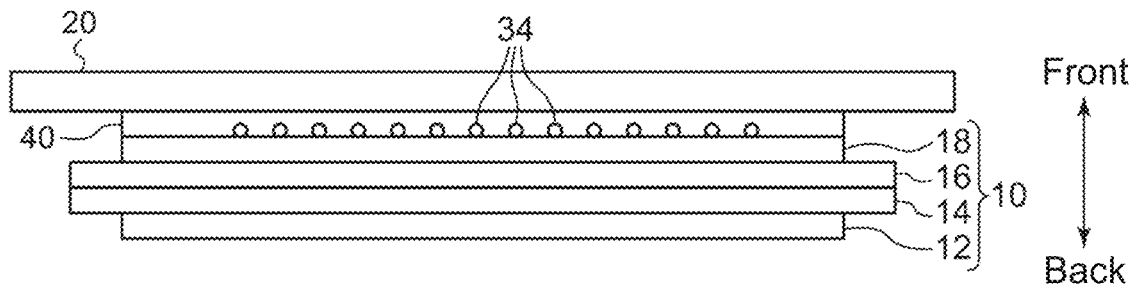
FIG. 6D is a diagram for explaining the method for producing the display device according to the second exemplary embodiment.

Next, as shown in FIG. 6D, protective layer 20 is bonded to polarizing plate 18 so that the applied translucent adhesive 40 is sandwiched between protective layer 20 and polarizing plate 18.

Next, translucent adhesive 40 is hardened by light or heat to form bonding layer 30 to complete display device 1. Hygroscopic agent 34 is disposed in a position that is substantially in contact with polarizing plate 18 in bonding layer 30.

According to the present exemplary embodiment, as described above, since each particle of hygroscopic agent 34 is disposed at a position overlapping a wiring extending in the y direction between pixels P1 of display 10 in planar view and maximum particle diameter d2 of hygroscopic agent 34 is smaller than width d3 of the wiring extending in the y direction between the pixels, the image light hardly transmits through hygroscopic agent 34. Accordingly, the image quality degradation caused by hygroscopic agent 34 can be suppressed, regardless of the optical characteristics, such as the transparency and the refractive index, for example, of hygroscopic agent 34. Therefore, the freedom degree of selecting the material used as hygroscopic agent 34 becomes high.

Also, similarly to the first exemplary embodiment, color change of polarizing plate 18 can be suppressed.

Third Exemplary Embodiment

A third exemplary embodiment differs from the first exemplary embodiment in that bonding layer 30 does not contain hygroscopic agent 34 and vent holes 38 are formed in protective layer 20 and bonding layer 30. The description hereinafter will be focused on differences from the first exemplary embodiment.

Figure 7:
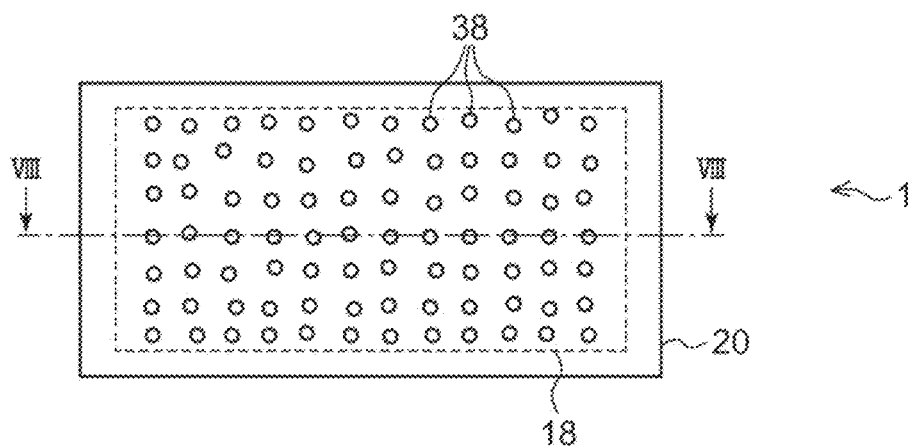
FIG. 7 is a top view schematically illustrating a display device according to a third exemplary embodiment.
Figure 8:
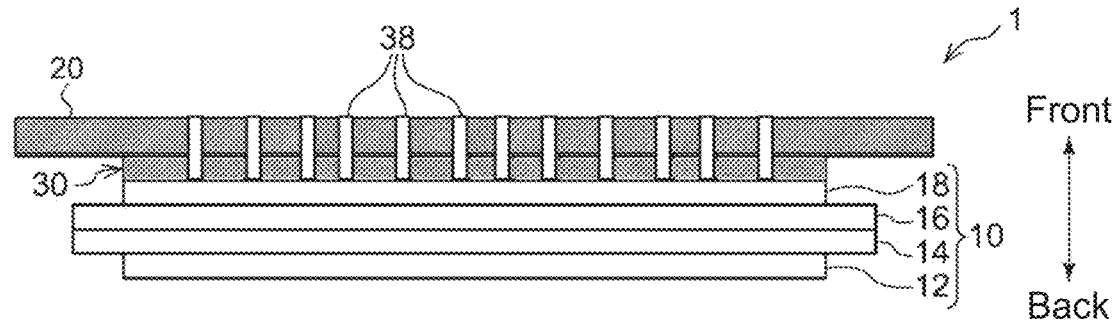
FIG. 8 is a schematic diagram illustrating a cross-section along a line VIII-VIII of the display device shown in FIG. 7.

FIG. 7 is a top view schematically illustrating display device 1 according to the third exemplary embodiment. FIG. 8 is a schematic diagram illustrating a cross-section along a line VIII-VIII of display device 1 shown in FIG. 7. As shown in FIGS. 7 and 8, a plurality of substantially cylindrical vent holes 38 are formed in protective layer 20 and bonding layer 30. Vent holes 38 are formed irregularly over almost an entire region of polarizing plate 18. To clarify explanation, the diameter of each vent hole 38 is exaggerated in FIG. 7 and other figures. Vent holes 38 may reach polarizing plate 18 so that a part of the front surface of polarizing plate 18 is exposed. Alternatively, vent holes 38 may not reach polarizing plate 18 so that a part of bonding layer 30 exists between the ends of vent holes 38 near polarizing plate 18 and polarizing plate 18. The part of bonding layer 30 between vent holes 38 and polarizing plate 18 may preferably be thin to allow moisture to easily evaporate.

Figure 9:
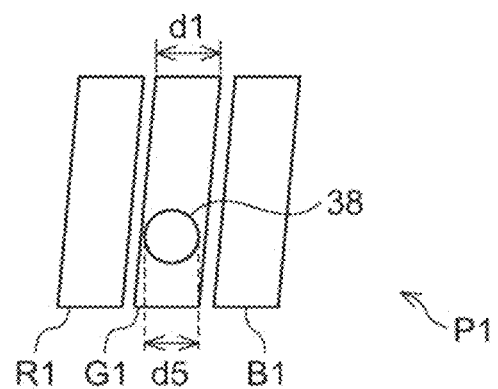
FIG. 9 is a top view illustrating an arrangement of a pixel of a display and a vent hole in the display device shown in FIG. 7.

FIG. 9 is a top view illustrating an arrangement of pixel P1 and vent hole 38 in display device 1 shown in FIG. 7. Diameter d5 of vent hole 38 is smaller than width d1 of each of subpixels R1, G1 and B1.

Next, a method for producing display device 1 shown in FIG. 7 will be described. First, a translucent adhesive is applied to a front surface of polarizing plate 18 of display 10, and then protective layer 20 is bonded to polarizing plate 18 so that the applied translucent adhesive is sandwiched between protective layer 20 and polarizing plate 18. Next, the translucent adhesive is hardened to form bonding layer 30. Next, a plurality of vent holes 38 are formed in protective layer 20 and bonding layer 30 by drilling from the front surface of protective layer 20 with a drill.

According to the present exemplary embodiment, it is possible to allow moisture contained in polarizing plate 18 to evaporate through vent holes 38 in high temperature conditions. Accordingly, similarly to the first exemplary embodiment, color change of polarizing plate 18 can be suppressed. Since moisture is allowed to evaporate for a longer period compared to the first exemplary embodiment, color change of polarizing plate 18 can be suppressed for a longer period compared to the first exemplary embodiment.

Here, since the translucency of vent holes 38 is higher than the translucency of each of bonding layer 30 and protective layer 20, the brightness of the image light passed through vent holes 38 becomes higher than the brightness of the image light passed through the other parts, so that glare might be caused. However, according to the present exemplary embodiment, since diameter d5 of each vent hole 38 is smaller than width d1 of each of subpixels R1, G1 and B1, glare can be suppressed, so that reduction of image quality can be suppressed.

Vent holes 38 may be formed at positions overlapping the wirings between pixels P1 in the same way as in the second exemplary embodiment shown in FIG. 5. In this case, it is preferable that diameter d5 of each vent hole 38 is smaller than the width of the wiring between pixels P1. Vent holes 38 can be formed by controlling the drilling position. This makes the image light hardly pass through vent holes 38, so that reduction of image quality can be suppressed more.

Fourth Exemplary Embodiment

A fourth exemplary embodiment differs from the third exemplary embodiment in that vent holes 38 are formed in bonding layer 30 and vent holes 38 are not formed in protective layer 20. The description hereinafter will be focused on differences from the first exemplary embodiment.

Figure 10A:
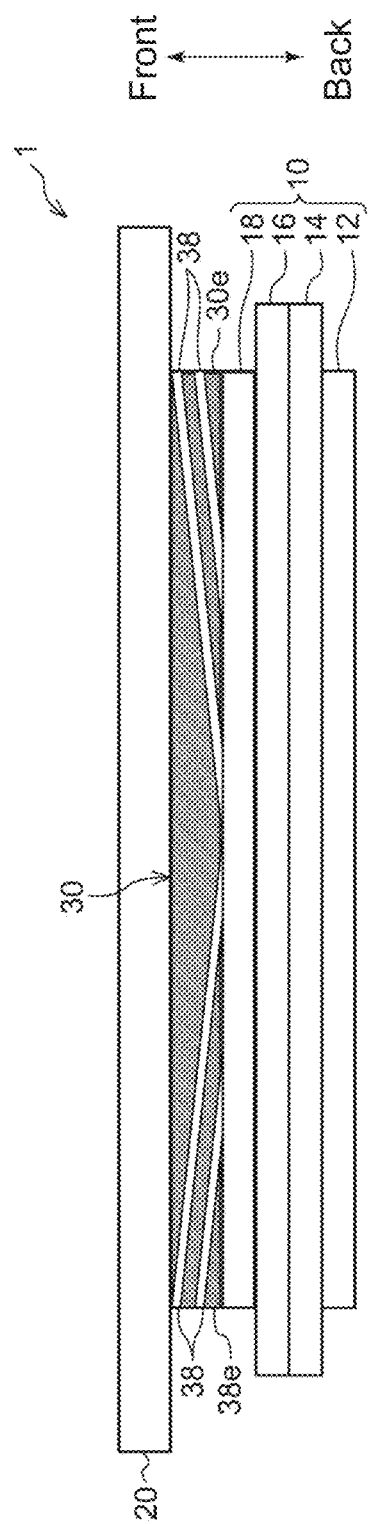
FIG. 10A is a schematic diagram illustrating a sectional view of a display device according to a fourth exemplary embodiment.

FIG. 10A is a schematic diagram illustrating a sectional view of a display device 1 according to the fourth exemplary embodiment. As shown in FIG. 10A, a plurality of vent holes 38 are formed such that each of vent holes 38 extends linearly between the surface, in contact with polarizing plate 18, of bonding layer 30 and an edge 30e of bonding layer 30. A part of bonding layer 30 may exist or may not exist between the end of each vent hole 38 closer to polarizing plate 18 and polarizing plate 18. Although not shown in the figure, vent holes 38 may extend from the vicinity of the center of bonding layer 30 to edges 30e of bonding layer 30 in planar view.

Next, a method for producing display device 1 shown in FIG. 10A will be described. First, a translucent adhesive is applied to a front surface of polarizing plate 18, and then protective layer 20 is bonded to polarizing plate 18 so that the translucent adhesive is sandwiched between protective layer 20 and polarizing plate 18. The translucent adhesive may be either an OCR or an OCA.

Next, needles or sticks are inserted into the translucent adhesive before being hardened along respective paths along which vent hole 38 are to be formed. Next, the translucent adhesive is hardened to form bonding layer 30, and, after the translucent adhesive has been hardened, the needles or sticks are pulled out. As a result, vent holes 38 are formed at the portions into which the needles or sticks have been inserted.

Figure 10B:
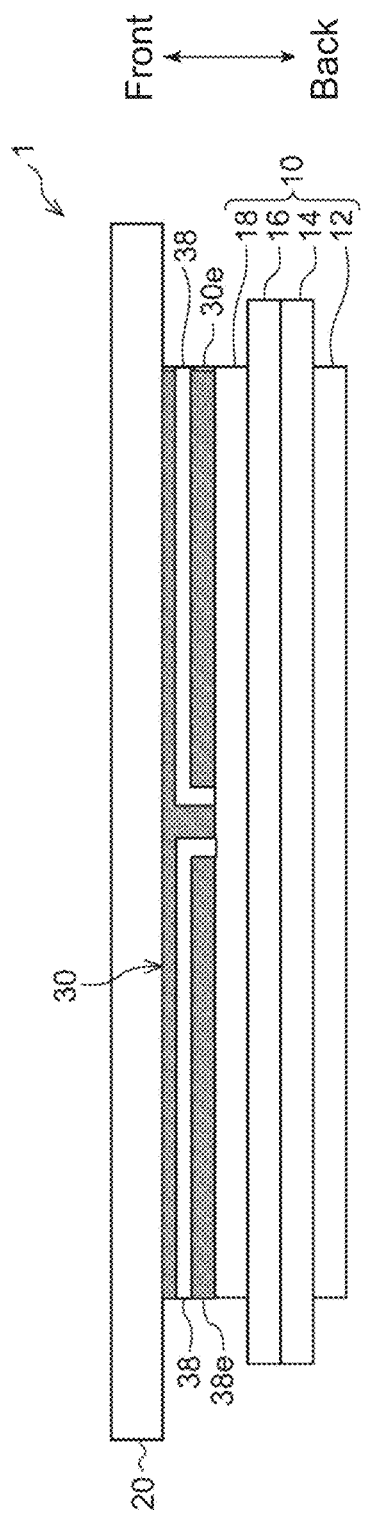
FIG. 10B is a schematic diagram illustrating a sectional view of a display device according to the fourth exemplary embodiment.

FIG. 10B is a schematic diagram illustrating a sectional view of another display device 1 according to the fourth exemplary embodiment. Each of vent holes 38 extends from the surface, in contact with polarizing plate 18, of bonding layer 30 at the vicinity of the center of bonding layer 30 toward protective layer 20, bends toward one of edges 30e of bonding layer 30, and extends to the one of edges 30e of bonding layer 30. Although not shown in the figure, vent holes 38 may extend from the vicinity of the center of bonding layer 30 to edges 30e of bonding layer 30 in planar view.

Next, a method for producing display device 1 shown in FIG. 10B will be described. First, a translucent adhesive is applied to a front surface of polarizing plate 18, and then protective layer 20 is bonded to polarizing plate 18 so that the applied translucent adhesive is sandwiched between protective layer 20 and polarizing plate 30. The translucent adhesive may be an OCR.

Next, L-shaped sticks each having a bent end are inserted into the translucent adhesive from edges to the vicinity of the center of the translucent adhesive layer before the translucent adhesive is hardened. The bent portion at the end of the stick may be made of a flexible material such as a rubber. Next, the translucent adhesive is hardened to form bonding layer 30, and, after the translucent adhesive has been hardened, the sticks are pulled out. The bent portion at the end of each of the sticks can deform to pass through vent hole 38. In this manner, vent holes 38 are formed at the portions where the sticks has been inserted.

Figure 11:
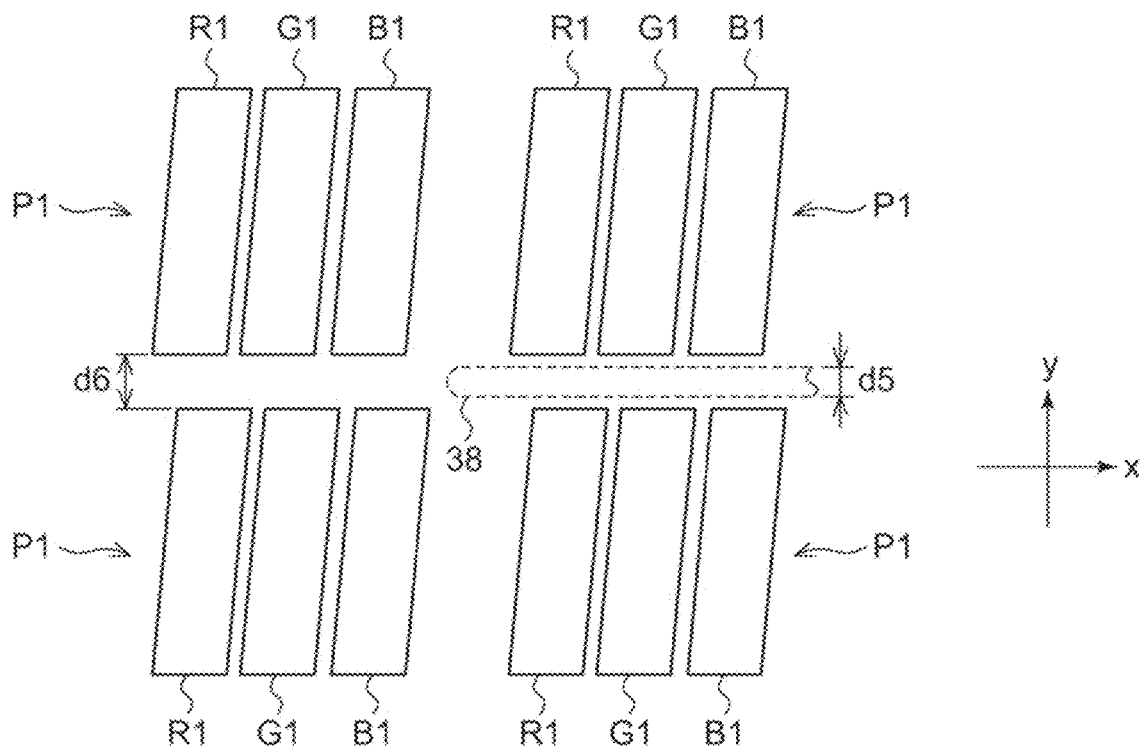
FIG. 11 is a top view illustrating an arrangement of pixels of the display and a vent hole of the display device shown in FIG. 10A.

FIG. 11 is a top view illustrating an arrangement of pixels P1 of display 10 and vent hole 38 of display device 1 shown in FIG. 10A. Each vent hole 38 is formed at a position overlapping a wiring extending in the x-direction between pixels P1 of display 10 in planar view. Diameter d5 of each vent hole 38 is smaller than width d6 of the wiring extending in the x-direction between pixels P1. Accordingly, the image light hardly passes through vent holes 38, so that degradation of image quality can be suppressed.

According to the present exemplary embodiment, as described above, since vent holes 38 are not formed in protective layer 20, vent holes 38 will not be filled with dust or the like which would otherwise enter from the front ends of vent holes 38. Accordingly, display device 1 according to the present exemplary embodiment is more convenient for use than display device 1 according to the third embodiment.

Also, in the third exemplary embodiment, drilling to form vent holes 38 produces cutting scraps. According to the present exemplary embodiment, on the other hand, it is not necessary to use the drill, so that such cutting scraps will not be produced.

Fifth Exemplary Embodiment

A fifth exemplary embodiment is a combination of the first exemplary embodiment with the third exemplary embodiment. The description hereinafter will be focused on differences from the first exemplary embodiment.

Figure 12:
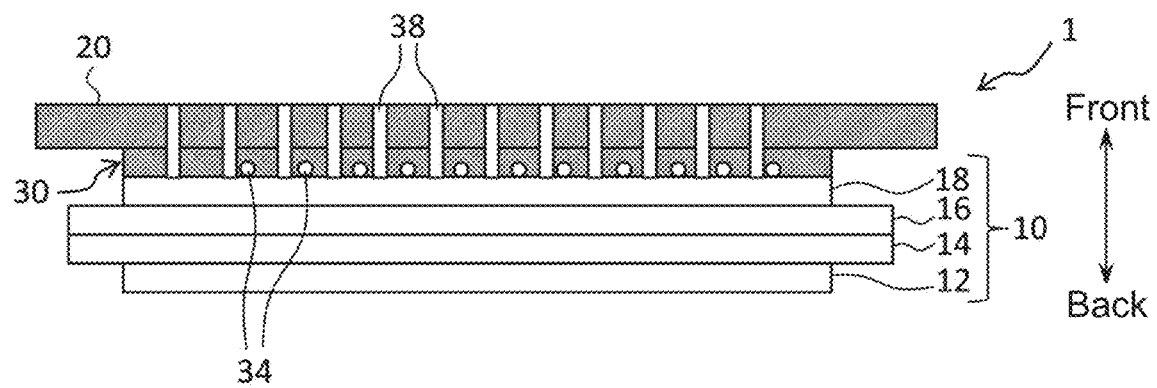
FIG. 12 is a schematic diagram illustrating a sectional view of a display device according to a fifth exemplary embodiment.

FIG. 12 is a schematic diagram illustrating a sectional view of display device 1 according to the fifth exemplary embodiment. In display device 1 shown in FIG. 12, in addition to the configuration of the first exemplary embodiment, vent holes 38 are formed in protective layer 20 and bonding layer 30.

Display device 1 can be produced in a manner as described below. First, display device 1 of the first exemplary embodiment is produced. Then, vent holes 38 are formed in protective layer 20 and bonding layer 30 by drilling from the front surface of protective layer 20 with a drill.

According to the present exemplary embodiment, moisture contained in polarizing plate 18 can be absorbed by hygroscopic agent 34 and can also evaporate through vent holes 38. Accordingly, even if the moisture absorbing capability of hygroscopic agent 34 is reduced due to moisture absorption, color change of polarizing plate 18 can be suppressed.

The fourth exemplary embodiment may be combined with the first exemplary embodiment. Also, the third exemplary embodiment may be combined with the second exemplary embodiment. Each of the new exemplary embodiments produced by these combinations has the respective advantageous effects of the exemplary embodiments combined.

Hereinabove, the present disclosure has been described based on the exemplary embodiments. Note that the above-described exemplary embodiments are merely examples. It would be apparent to any person skilled in the art that combinations of the components and processes in the exemplary embodiments may be variously modified and that such modified results are also within the scope of the present disclosure.

Figure 13:
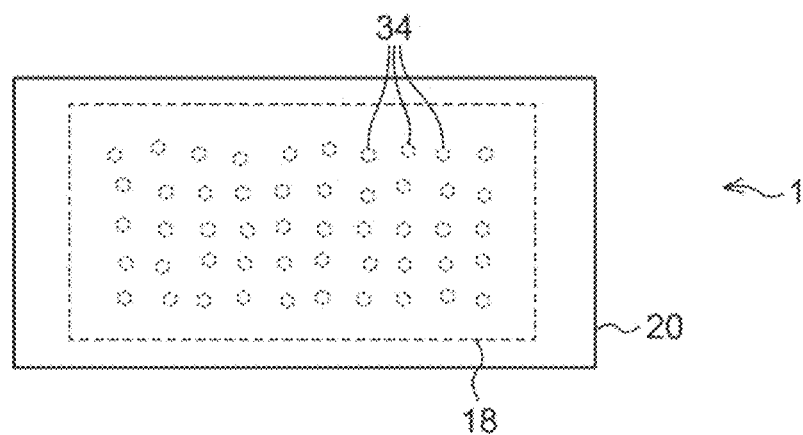
FIG. 13 is a top view of a display device according to a modified example of the first exemplary embodiment.

For example, although hygroscopic agent 34 is disposed on almost the entire planer region of polarizing plate 18 in the first, second and fifth exemplary embodiments, the disposing area of hygroscopic agent 34 may not be limited to this. FIG. 13 is a top view of display device 1 according to a modified example of the first exemplary embodiment. Hygroscopic agent 34 is not disposed in the peripheral region of polarizing plate 18. In this modified example, although the moisture absorption capability may be low compared to the first, second and fifth exemplary embodiments, the used amount of hygroscopic agent 34 can be reduced, so that cost of hygroscopic agent 34 can be reduced.

Similarly to the above-described modified example, vent holes 38 in the third and fourth exemplary embodiments also may not be disposed in the peripheral region of polarizing plate 18. In this modified example, although the capability of allowing moisture to evaporate may be low compared to the third and fourth exemplary embodiments, the number of vent holes 38 formed by drilling is reduced, so that display device 1 can be produced more easily.

Furthermore, the volume of hygroscopic agent 34 contained in a unit volume of bonding layer 30 may not be larger in the region closer to polarizing plate 18 in bonding layer 30 than in the region closer to protective layer 20 in bonding layer 30. The volume of hygroscopic agent 34 contained in a unit volume of bonding layer 30 may be substantially uniform in bonding layer 30 or may be smaller in the region closer to polarizing plate 18 in bonding layer 30 than in the region closer to protective layer 20 in bonding layer 30. In these modification examples also, color change of polarizing plate 18 at a high temperature can be suppressed compared to the case in which hygroscopic agent 34 is not provided.

Figure 14:
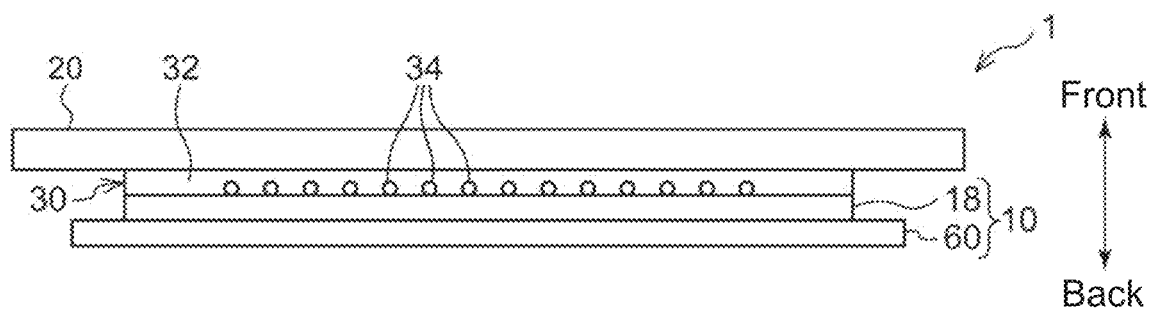
FIG. 14 is a schematic diagram illustrating a sectional view of the display device according to a modified example of the first exemplary embodiment.

Meanwhile, display device 1 of each of the above-described exemplary embodiments may be configured as an organic electro-luminescence (OEL) display device. FIG. 14 is a schematic diagram illustrating a sectional view of display device 1 according to a modified example of the first exemplary embodiment. Display 10 has organic electro-luminescence element substrate 60 and polarizing plate 18. Organic electro-luminescence element substrate 60 radiates light toward the front end of display 10. Polarizing plate 18 may, for example, be a circularly polarizing plate and is disposed at the front side of organic electro-luminescence element substrate 60 to prevent contrast reduction caused by reflection of external light entering display device 1. In the same way as the first exemplary embodiment, bonding layer 30 containing hygroscopic agent 34 and protective layer 20 are disposed at the front side of polarizing plate 18. This modification may be applied to the other exemplary embodiments. In this modified example, the advantageous effects of each of the above described exemplary embodiments can be obtained in the organic electro-luminescence display device.

The aspects of the present disclosure is defined as follows.

[Item 1]

A display device includes a display, a protective layer, and a bonding layer. The display has a polarizing plate configuring an image display plane of the display. The protective layer faces the polarizing plate. The bonding layer is disposed between the polarizing plate and the protective layer and is directly bonded to the polarizing plate and the protective layer. The bonding layer contains a hygroscopic agent.

According to this aspect, moisture contained the polarizing plate evaporates in high temperature conditions and is absorbed by the hygroscopic agent. As a result, chemical reactions caused by the moisture and temperature conditions in the polarizing plate in high temperature conditions can be suppressed, so that color change of the polarizing plate can be suppressed. Accordingly, reliability of the display device at a high temperature can be improved.

[Item 2]

In the display device as defined in Item 1, a volume of the hygroscopic agent contained in a unit volume of the bonding layer may be larger in a region closer to the polarizing plate in the bonding layer than in a region closer to the protective layer in the bonding layer.

In this case, color change of the polarizing plate can be suppressed efficiently, while reducing the amount of the hygroscopic agent.

[Item 3]

In the display device as defined in Item 1 or 2, a maximum particle diameter of the hygroscopic agent may be smaller than a width of a subpixel contained in a pixel of the display.

In this case, reduction of image quality caused by the hygroscopic agent can be suppressed.

[Item 4]

In the display device as defined in Item 1 or 2, the hygroscopic agent may overlap a wiring between pixels of the display in planar view, and a maximum particle diameter of the hygroscopic agent may be smaller than a width of the wiring.

In this case, degradation of image quality caused by the hygroscopic agent can be suppressed.

[Item 5]

In the display device as defined in any of Items 1 to 4, the bonding layer may be provided with a vent hole.

In this case, moisture contained in the polarizing plate can also evaporate through the vent hole. Accordingly, even when the moisture absorbing capability of the hygroscopic agent is reduced due to moisture absorption, color change of the polarizing plate can be suppressed.

[Item 6]

A method for producing a display device in another aspect of the present disclosure includes a step of applying a translucent adhesive containing a hygroscopic agent onto a surface of a polarizing plate configuring an image display plane of a display. The method for producing the display device further includes a step of sandwiching the applied translucent adhesive between the polarizing plate and a protective layer so as to bond the protective layer to the polarizing plate. The method for producing the display device further includes a step of hardening the translucent adhesive sandwiched between the polarizing plate and the protective layer.

According to this aspect, reliability of the display device at a high temperature can be improved.

[Item 7]

A method for producing a display device in still another aspect of the present disclosure includes a step of disposing a mask on a surface of a polarizing plate configuring an image display plane of a display. The mask has a plurality of openings. The surface of the polarizing plate is to face a user of the display device when the display device is used. The method for producing the display device further includes a step of filling the plurality of openings of the mask on the polarizing plate with a hygroscopic agent. The method for producing the display device further includes a step of removing the mask from the surface of the polarizing plate. The method for producing the display device further includes a step of applying a translucent adhesive onto the surface of the polarizing plate from which the mask has been removed and the hygroscopic agent left on the surface of the polarizing plate. The method for producing the display device further includes a step of sandwiching the applied translucent adhesive between the polarizing plate and a protective layer so as to bond the protective layer to the polarizing plate. The method for producing the display device further includes a step of hardening the translucent adhesive sandwiched between the polarizing plate and the protective layer.

According to this aspect, reliability of the display device at a high temperature can be improved. Also, the position of disposing the hygroscopic agent can be controlled.

The present disclosure is useful as a display device and a method for producing a display device.

What is claimed is:
1. A display device comprising:
a display having a polarizing plate configuring an image display plane of the display;
a protective layer facing the polarizing plate; and
a bonding layer disposed between the polarizing plate and the protective layer and directly bonded to the polarizing plate and the protective layer,
wherein the bonding layer includes a translucent adhesive and a plurality of particles of a hygroscopic agent dispersed in the translucent adhesive, and
wherein a maximum particle diameter of the hygroscopic agent is smaller than a width of a subpixel contained in a pixel of the display.
2. The display device according to claim 1,
wherein a volume of the hygroscopic agent contained in a unit volume of the bonding layer is larger in a region closer to the polarizing plate in the bonding layer than in a region closer to the protective layer in the bonding layer.
3. The display device according to claim 1,
wherein the hygroscopic agent overlaps a wiring between pixels of the display in planar view, and
the maximum particle diameter of the hygroscopic agent is smaller than a width of the wiring.
4. The display device according to claim 1,
wherein the bonding layer is provided with a vent hole.
5. A method for producing a display device, the method comprising:
applying a translucent adhesive containing a hygroscopic agent onto a surface of a polarizing plate configuring an image display plane of a display;
sandwiching the applied translucent adhesive between the polarizing plate and a protective layer so as to bond the protective layer to the polarizing plate; and
hardening the translucent adhesive sandwiched between the polarizing plate and the protective layer.

6. A method for producing a display device, the method comprising:
- disposing a mask on a surface of a polarizing plate configuring an image display plane of a display, the mask having a plurality of openings, and the surface being to face a user when the display device is used;
- filling the plurality of openings of the mask on the polarizing plate with a hygroscopic agent;
- removing the mask from the surface of the polarizing plate;
- applying a translucent adhesive onto the surface of the polarizing plate from which the mask has been removed and the hygroscopic agent left on the surface of the polarizing plate;
- sandwiching the applied translucent adhesive between the polarizing plate and a protective layer so as to bond the protective layer to the polarizing plate; and
- hardening the translucent adhesive sandwiched between the polarizing plate and the protective layer.

7. The display device according to claim 1, wherein the plurality of particles of the hygroscopic agent are dispersed irregularly over an entire region of the polarizing plate.

* * * * *